(12) United States Patent
Weaver et al.

(10) Patent No.: US 9,816,362 B2
(45) Date of Patent: Nov. 14, 2017

(54) VISCOSITY ENHANCER

(71) Applicant: Halliburton Energy Services, Inc., Houston, TX (US)

(72) Inventors: Jimmie Dean Weaver, Duncan, OK (US); David Loveless, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/032,001

(22) PCT Filed: Nov. 25, 2013

(86) PCT No.: PCT/US2013/071700
§ 371 (c)(1),
(2) Date: Apr. 25, 2016

(87) PCT Pub. No.: WO2015/076843
PCT Pub. Date: May 28, 2015

(65) Prior Publication Data
US 2016/0272881 A1  Sep. 22, 2016

(51) Int. Cl.
| | | |
|---|---|---|
| E21B 43/16 | (2006.01) |
| C09K 8/68 | (2006.01) |
| C09K 8/035 | (2006.01) |
| C09K 8/08 | (2006.01) |
| C09K 8/90 | (2006.01) |
| E21B 43/26 | (2006.01) |
| E21B 43/267 | (2006.01) |

(52) U.S. Cl.
CPC .............. *E21B 43/16* (2013.01); *C09K 8/035* (2013.01); *C09K 8/08* (2013.01); *C09K 8/68* (2013.01); *C09K 8/90* (2013.01); *C09K 2208/34* (2013.01); *E21B 43/26* (2013.01); *E21B 43/267* (2013.01)

(58) Field of Classification Search
None
See application file for complete search history.

(56) References Cited

U.S. PATENT DOCUMENTS 4,254,257 A * 3/1981 Schroeck ............ C08B 37/0033
426/658
4,265,673 A * 5/1981 Pace ....................... C12P 19/04
106/175.1

(Continued)

OTHER PUBLICATIONS

International Search Report issued in related PCT Application No. PCT/US2013/071700 dated Aug. 25, 2014, 9 pages.

(Continued)

*Primary Examiner* — Angela M DiTrani
*Assistant Examiner* — Anuradha Ahuja
(74) *Attorney, Agent, or Firm* — Craig W. Roddy; Baker Botts L.L.P.

(57) ABSTRACT

A method of treating a well, the method including forming in-situ or using a polymeric material in a treatment fluid that is introduced into a well, wherein the polymeric material is produced by reacting: (a) a polysaccharide, wherein each molecule of the polysaccharide has at least one reducing chain end; and (b) a chain connector, wherein each molecule of the chain connector has at least two functional groups for reacting with the reducing end of the polysaccharide.

20 Claims, 5 Drawing Sheets

CROSS LINKER

(56) References Cited

U.S. PATENT DOCUMENTS

| | | | | |
|---|---|---|---|---|
| 4,591,639 | A * | 5/1986 | Fischer | C12P 19/06 252/194 |
| 5,075,503 | A * | 12/1991 | Lin | C07C 243/34 528/111 |
| 5,341,876 | A * | 8/1994 | Burns | C09K 8/508 166/263 |
| 5,404,951 | A * | 4/1995 | Lai | E21B 33/138 166/295 |
| 6,450,260 | B1 * | 9/2002 | James | C09K 8/508 166/277 |
| 6,465,694 | B1 * | 10/2002 | Baudys | C07C 45/38 568/41 |
| 6,488,091 | B1 * | 12/2002 | Weaver | C09K 8/62 166/300 |
| 6,642,363 | B1 | 11/2003 | Mooney et al. | |
| 2006/0030493 | A1 * | 2/2006 | Segura | C09K 8/685 507/244 |
| 2006/0185850 | A1 * | 8/2006 | Segura | C09K 8/68 166/305.1 |
| 2007/0275862 | A1 * | 11/2007 | Melbouci | C09K 8/68 507/209 |
| 2009/0075845 | A1 | 3/2009 | Abad et al. | |
| 2012/0111570 | A1 | 5/2012 | Smith et al. | |
| 2012/0277128 | A1 | 11/2012 | Li et al. | |
| 2014/0158355 | A1 * | 6/2014 | Wuthrich | C09K 8/588 166/294 |

OTHER PUBLICATIONS

International Preliminary Report on Patentability issued in related Application No. PCT/US2013/071700, dated Jun. 9, 2016 (7 pages).

\* cited by examiner

VISCOSITY ENHANCER

CROSS-REFERENCE TO RELATED APPLICATIONS

The present application is a U.S. National Stage Application of International Application No. PCT/US2013/071700 filed Nov. 25, 2013, which is incorporated herein by reference in its entirety for all purposes.

TECHNICAL FIELD

The disclosure is in the field of producing crude oil or natural gas from subterranean formations. More specifically, the disclosure generally relates to methods for increasing the viscosity of a treatment fluid for use in a well.

BACKGROUND

Polysaccharides are conventionally used to viscosify water that is used in well completions to enhance the ability of water to transport solids, reduce fluid loss, and to minimize friction losses. Fluid-loss control and solids transport properties are enhanced by the addition of crosslinkers that tie multiple polymer chains together a depicted in FIG. 1. This results in the formation of gel-like fluids and extreme increase in viscosity. In order to form stable gels, it is necessary that the concentration of the polymer be at or above the C* (the critical overlap concentration). Crosslinking process, however, reduces the polymer's ability to suppress friction during pumping operations and in fact often results in increased friction. Optimal friction reduction occurs with high molecular weight, linear polymers.

On the left side of FIG. 1 is a simplified representation of a polysaccharide with single reducing chain ends, wherein the polysaccharide is dispersed or dissolved in an aqueous phase (not represented in the figure). When a crosslinker is added, linking occurs randomly throughout the intermolecular structure as shown on the right side of FIG. 1, resulting in an exponential increase in viscosity and the formation of a gel.

GENERAL DESCRIPTION OF EMBODIMENTS

This disclosure provides a method by which at least two polysaccharide chains are connected at their ends to provide an increase in the average molecular weight, and preferably at least a doubling in the average molecular weight of the polymer.

FIG. 2 depicts this process where a chain connector reacts with the end of two polysaccharide chains tying them together. The corresponding increase in molecular weight results in improved friction performance and a reduction in the C* suggesting that stable gels can be formed at lower polymer concentration. Top left of FIG. 2 is a simplified representation of a polysaccharide with single reducing chain ends, wherein the polysaccharide is dispersed or dissolved in an aqueous phase (not represented in the figure). The bottom of FIG. 2 shows how a chain connector connects two polysaccharides together through reaction with the reducing end of the polymer chains. Such a connection increases the viscosity, decreases the overlap concentration, C*, but does not cause gelation.

It is also contemplated that a multifunctional chain connector group would result in the connection of the ends of polymer chains in a non-linear fashion. For example, a tri-functional chain connector would connect three polymer arms, whereas a tetra-functional connector would connect four polymer arms.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

BRIEF DESCRIPTION OF THE DRAWING

The accompanying drawing is incorporated into the specification to help illustrate examples according to a presently preferred embodiment of the disclosure. It should be understood that the figures of the drawing are not necessarily to scale.

DETAILED DESCRIPTION OF PRESENTLY PREFERRED EMBODIMENTS AND BEST MODE

Figure 1:
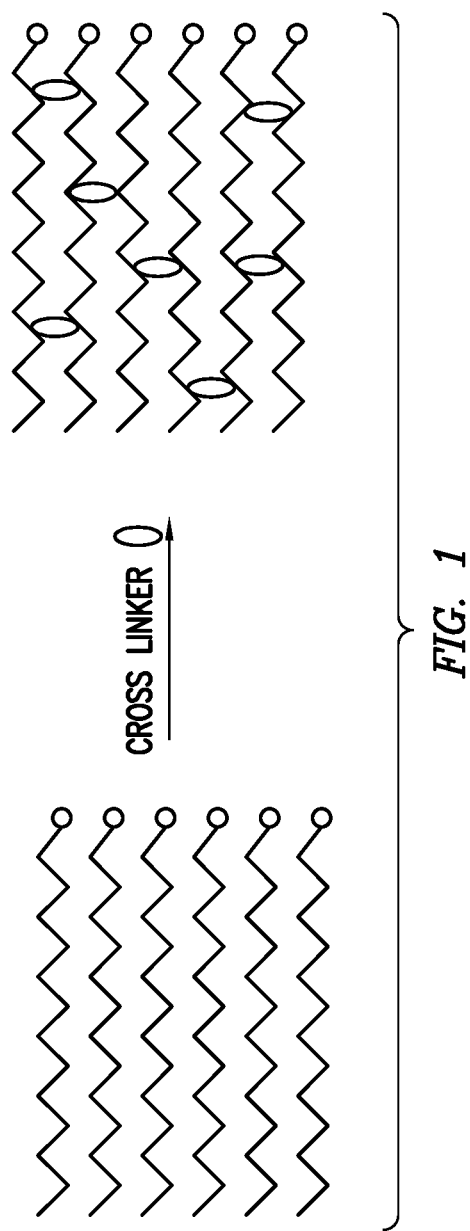
FIG. 1 is a simplified skeletal representation of a polysaccharide with single reducing chain ends, wherein the polysaccharide is dispersed or dissolved in an aqueous phase (not represented in the figure), wherein when a cross linker is added, linking occurs randomly throughout the intermolecular structure as shown on the right side of FIG. 1.
Figure 2:
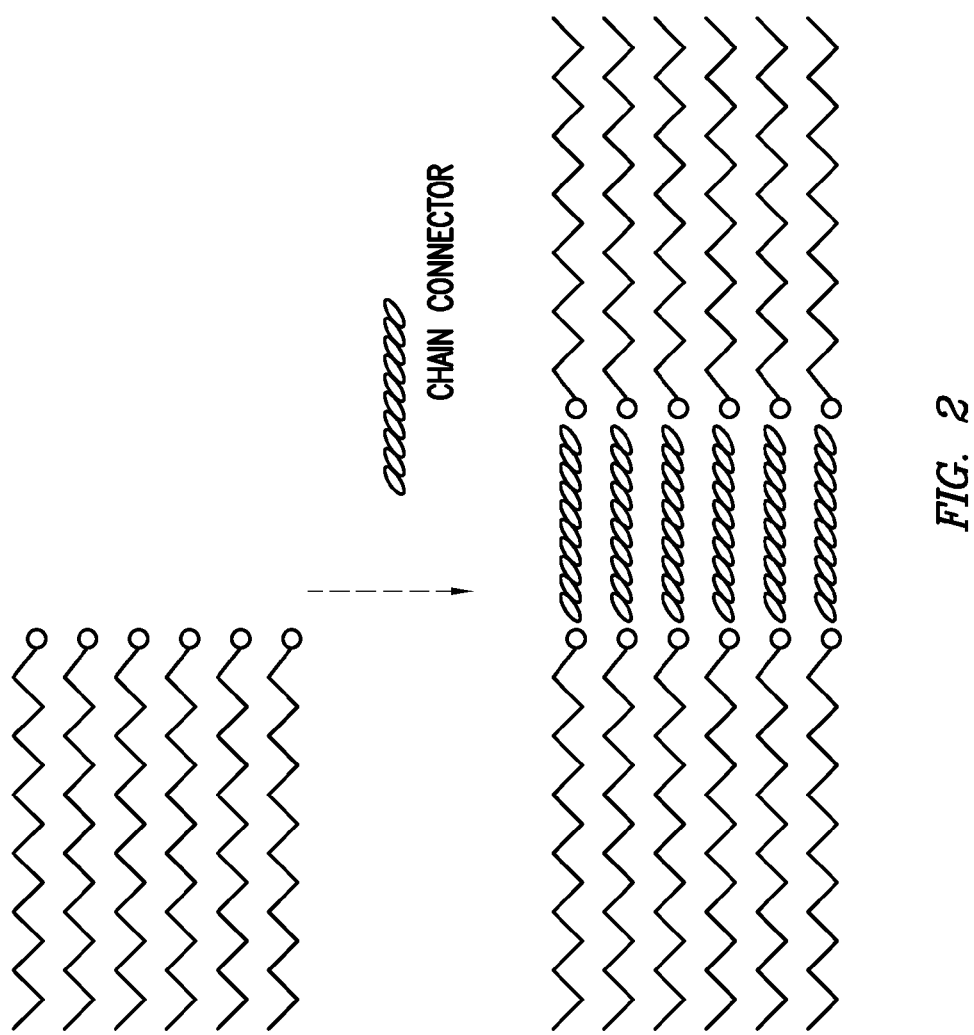
FIG. 2 is a simplified representation of a polysaccharide with single reducing chain ends, wherein the polysaccharide is dispersed or dissolved in an aqueous phase (not represented in the figure), wherein when a chain connector is added, it can connect two polysaccharides together through reaction with the reducing end of the polymer chains.

Definitions and Usages
General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a liner pipe, and a transportation pipe.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Fluid loss refers to the undesirable leakage of a fluid phase of any type of fluid into the permeable matrix of a zone, which zone may or may not be a treatment zone. Fluid-loss control refers to treatments designed to reduce such undesirable leakage.

Fluid-loss control materials are sometimes used in drilling fluids or in treatment fluids. A fluid-loss control pill is a treatment fluid that is designed or used to provide some degree of fluid-loss control. A fluid-loss control pill is usually used prior to introducing another drilling fluid or treatment fluid into zone.

Generally, the greater the depth of the formation, the higher the static temperature and pressure of the formation. Initially, the static pressure equals the initial pressure in the formation before production.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases, Physical States, and Materials

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

The continuous phase of a treatment fluid is a fluid under Standard Laboratory Conditions.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Pumping Time

As used herein, the "pumping time" is the total time required for pumping a treatment fluid into a desired portion or zone of the well plus a safety factor.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

General Approach

In various embodiments, a method of treating a well is provided, the method comprising: (A) forming a treatment fluid comprising: (i) an aqueous phase; (ii) a polysaccharide, wherein each molecule of the polysaccharide has at least one reducing chain end, wherein the polysaccharide is dispersed or dissolved in the aqueous phase; and (iii) a chain connector, wherein each molecule of the chain connector has at least two functional groups for reacting with the reducing chain ends of the polysaccharide, wherein the chain connector is dispersed or dissolved in the aqueous phase; and (B) introducing the treatment fluid into a well. In some of these embodiments, the method can include allowing time for the polysaccharide to react with the chain connector prior to introducing the treatment fluid into the well. This time can be determined under the design conditions for a pumping time or a treatment time or fluid time in a treatment zone.

In various embodiments, a method of treating a well is provided, the method comprising: (A) forming a treatment fluid comprising: (i) an aqueous phase; and (ii) a polymeric material produced by reacting: (a) a polysaccharide, wherein each molecule of the polysaccharide has at least one reducing chain end; and (b) a chain connector, wherein each molecule of the chain connector has at least two functional groups for reacting with the reducing end of the polysaccharide; and (B) introducing the treatment fluid into a well.

In addition, such a method can be applicable to extending the molecular weight of polysaccharides that are recovered from dilute solution, such as flow-back water from a prior treatment with a polysaccharide or during the fermentation production of a polysaccharide.

Chain extension according to this disclosure can be used to increase viscosity yield without the formation of gels, which can be difficult to manage. Doubling molecular weight of a bio-produced polysaccharide can significantly improve production and product performance while allowing the use of a lower concentration of the polymeric material.

In some embodiments, an in-situ reaction can be used to provide a self-healing friction reducer.

Applications for this disclosure can include, without limitation: (1) When using dilute guar solution in an aqueous phase is used as a friction reducer fluid, the addition of the chain connector will permit an added reduction in friction pressure. (2) As a polymer chain is broken while pumping, the connector can provide a method by which the broken polymer chain can "heal" itself by connecting various polymer molecules and increasing the average molecular weight of the polymeric material. (3) The methods can be used in fracturing operations to reduce friction, where at least sufficient time is allowed for the reaction to occur prior to the step of introducing the treatment fluid into a well. (4) Other applications can be envisioned where an increase in molecular weight without crosslinking would be beneficial.

Optionally Producing the Polymeric Material Prior to Forming a Treatment Fluid

In various embodiments, producing the polymeric material additionally includes a step of producing the polysaccharide for use in producing the polymeric material. For example, the polysaccharide can be formed in a fermentation broth. In some of these embodiments, the method additionally includes the step of reacting the polysaccharide and the chain connector without isolating the polysaccharide from the formation broth. In reactions that can be catalyzed with acid, for example, the step of reacting the polysaccharide and the chain connector is in an aqueous solution having an acidic pH. Any of these embodiments can further include a step of isolating the polymeric material from the formation broth.

For example, when a bacterium is used to produce guar via a fermentation method, it is normally recovered from the growing broth (typically about 0.1% guar) by precipitation with alcohol, then dried. In this case, there would be sufficient time to allow the coupling reaction to fully develop and thereby double the molecular weight during the workup procedure for obtaining the polymeric material.

Polysaccharides and Derivatives

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

A polymer can be classified as being single chain or multi chain, based on its solution structure in aqueous liquid media. Examples of single-chain polysaccharides that are commonly used in the oilfield industry include guar, guar derivatives, and cellulose derivatives. Examples of multi-chain polysaccharides include xanthan, diutan, and scleroglucan, and derivatives of any of these. Without being limited by any theory, it is currently believed that multi-chain polysaccharides have a solution structure similar to a helix or are otherwise intertwined.

According to the present disclosure, single-chain polymers are preferred. In various embodiments, the polysaccharide can be selected from the group consisting of guar, guar derivatives, cellulose, and cellulose derivatives. Guar polymer, which is derived from the beans of a guar plant, is referred to chemically as a galactomannan gum.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, carboxymethylhydroxypropylguar ("CM-HPG"), ethylcarboxymethylguar, hydroxyethylguar, hydroxypropylmethylguar, and hydroxypropylguar ("HPG").

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

Preferably, the polysaccharide or derivative is water-soluble.

In various embodiments, the polysaccharide or derivative can have an average molecular weight in the range of from about 50,000 to 20,000,000, most preferably from about 100,000 to about 4,000,000. For example, guar polymer is believed to have an average molecular weight in the range of about 2 to about 4 million.

Chain Connector Chemistry and Examples

In various embodiments, functional imine-forming groups can be employed as a chain connecting compound. To facilitate a better understanding of the present disclosure, the following examples of some embodiments are given. In no way should the following examples be read to limit, or define, the entire scope of the disclosure.

Figure 3:
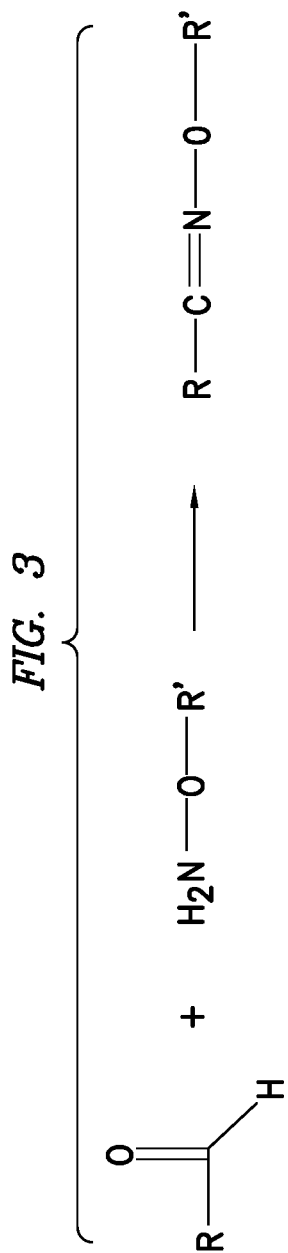
FIG. 3 is a skeletal representation of a reaction of a hydroxylamine with an aldehyde to form an oxime.

In various embodiments, the detailed description of this disclosure relates to the chemistry of aldehydes. For example, the chemical reaction represented in FIG. 3 shows the reaction of a hydroxylamine with an aldehyde to form an oxime. Typically, this reaction is used to in qualitative organic chemistry to identify aldehydes because the oximes are easy to form and generally form nice crystals making purification simple. A host of substituted hydroxylamines are commercially available, which could be used for this purpose.

A second aspect of this disclosure relates to the recognition that polysaccharides generally have at least one end that is a reducing sugar moiety.

Polysaccharides generally have at least one reducing end, which is often shown as and hemiacetal (reducing end). Acetals are generally in equilibrium in water with an aldehyde structure. Such an aldehyde can react with a hydroxylamine. Accordingly, a di-hydroxylamine can couple two such aldehydes.

Figure 4:
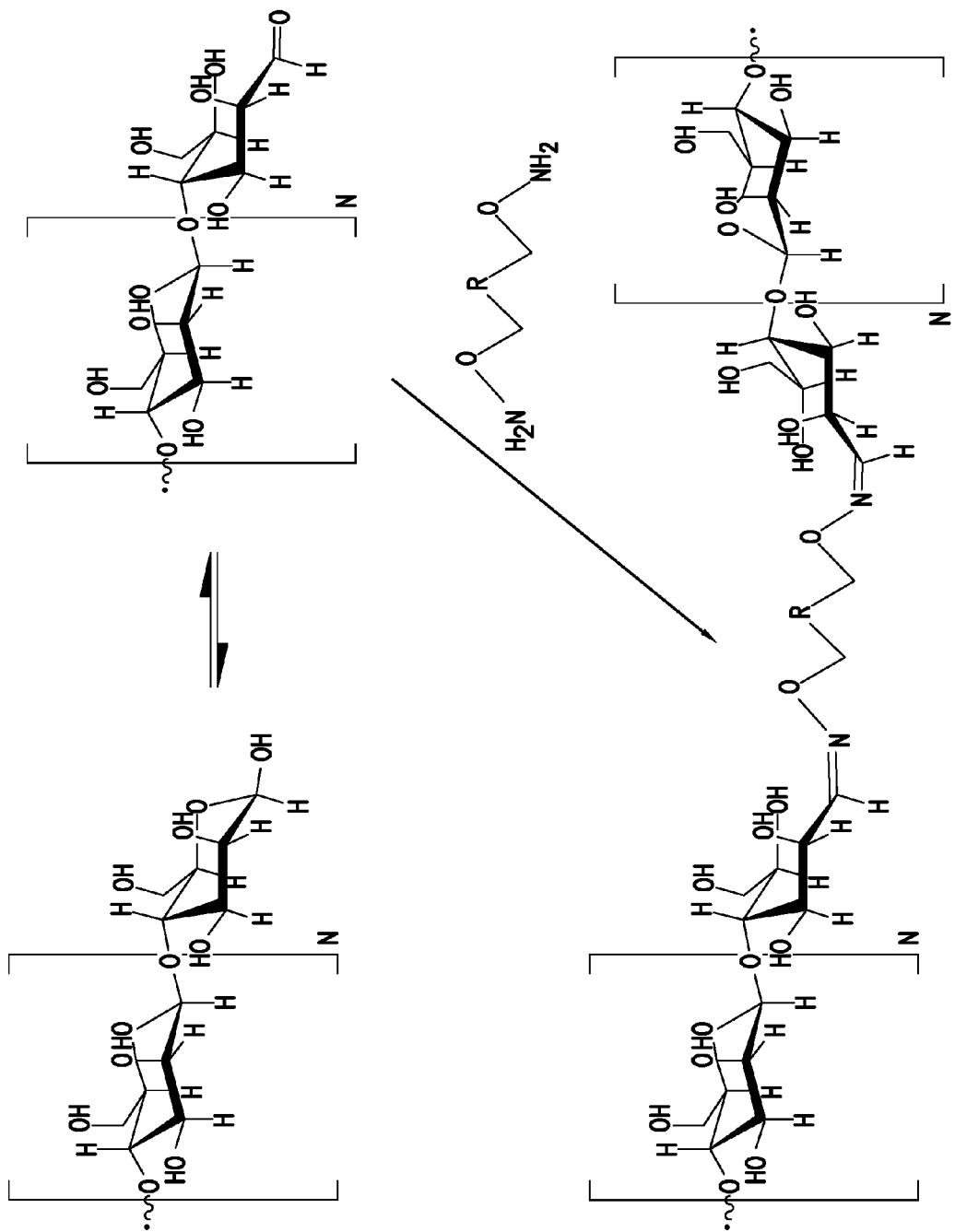
FIG. 4 is a Hawthorn representation of a polysaccharide having a hemiacetal (reducing end) represented in the structure on the top left, which in water is in equilibrium with an aldehyde structure represented in the structure on the top right. Such an aldehyde structure is available for reaction with a di-hydroxylamine as shown, which results in the coupling of two polysaccharide chains together.

This is shown in FIG. 4, where the terminal sugar of a polysaccharide has a hemiacetal (reducing end) represented in the structure on the top left, which in water is in equilibrium with an aldehyde structure represented in the structure on the top right. Such an aldehyde structure is available for reaction with the di-hydroxylamine shown, which results in the coupling of two polysaccharide chains together. As the reaction proceeds and the aldehyde form is consumed, the equilibrium will continue to convert the hemiacetal form to the aldehyde form to maintain the equilibrium ratio. Theoretically, this could continue until all the reaction proceeds to completion.

Such chemistry can be generalized as follows. Aldehydes a ketones react with primary amines to form a class of compounds called imines.

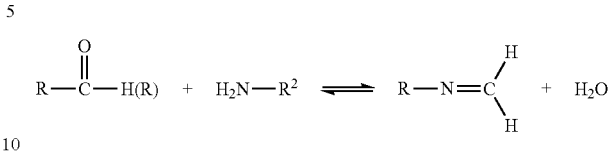

Derivatives of imines that form stable compounds with aldehydes and ketones include phenythydrazine, 2,4-dinitrophenylhydrazine, hydroxylamine, and semicarbazide, as illustrated below.

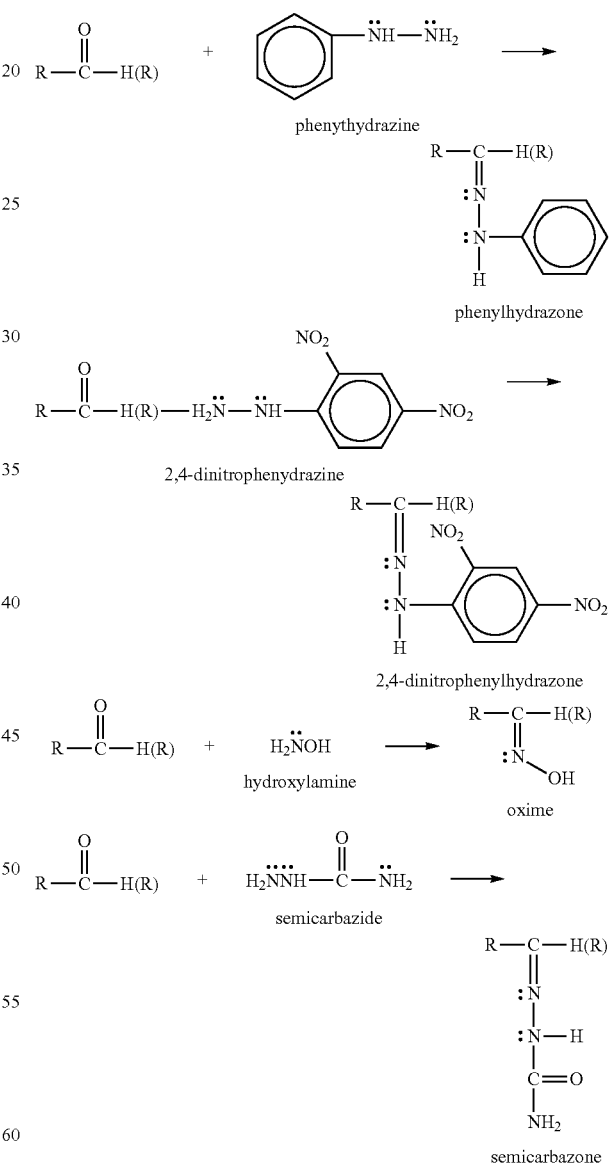

In various embodiments, the chain connector can be or comprise a di-functional or multi-functional group that forms an imine with an aldehyde. For example, the chain connector can be or comprise a polyethylene oxide with both ends having terminal groups selected from the group consisting of hydrazine, hydroxylamine, semicarbazide, and any combination thereof.

Figure 5:
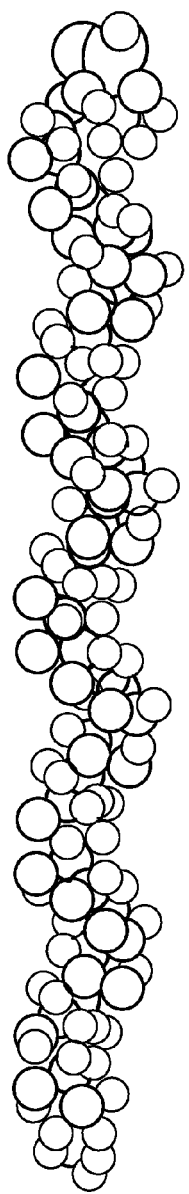
FIG. 5 is a space-filling representation of a small section of a 20-unit section of polymannose (the backbone polymer in guar) with a reducing end.
Figure 6:
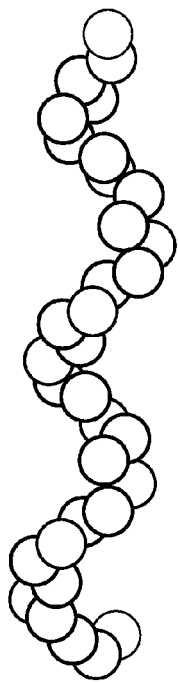
FIG. 6 is a space-filling representation of a polyethylene oxide chain that has been aminated resulting in both ends having hydroxylamine terminal groups.
Figure 7:
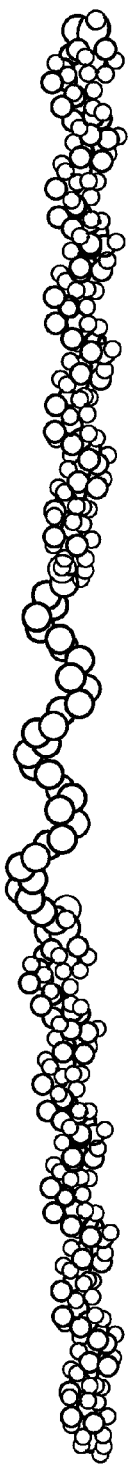
FIG. 7 is a space-filling representation of two polysaccharide chains coupled together through the polymeric di-hydroxylamine to effectively more than double the molecular weight of the polysaccharide.

FIG. 5 is a representation of a small section of a polymannose (the backbone polymer in guar) with a reducing end. FIG. 6 is a representation of a polyethylene oxide chain that has been aminated resulting in both ends having hydroxylamine terminal groups. Such a polyethylene oxide with terminal hydroxylamine groups is very water-soluble. When such a polymannose and polyethylene are mixed, the aldehyde form of the polymannose reacts coupling two polymannose chains together. This results in a significant increase in the molecular weight of the polymannose polymer, as represented in FIG. 7.

Aqueous Phase

In various embodiments, the aqueous phase comprises a source of water selected from the group consisting of: freshwater, brackish water, brine, well flow-back water, well produced water, and any combination thereof.

In various embodiments, the aqueous phase comprises an inorganic salt dissolved therein.

In various embodiments, the aqueous phase has an acidic pH. Preferably, the pH of the continuous aqueous phase of the treatment fluid is in the range of about 4 to about 11, preferably in the range of about 6 to 10. In various embodiments, the pH of the continuous phase is at least slightly acidic.

In certain embodiments, the treatment fluids can include a pH-adjuster. Preferably, the pH adjuster does not have undesirable properties, as discussed above.

The pH-adjuster may be present in the treatment fluids in an amount sufficient to maintain or adjust the pH of the fluid. In some embodiments, the pH-adjuster may be present in an amount sufficient to maintain or adjust the pH of the fluid to a pH in the range of from about 4 to about 11. One of ordinary skill in the art, with the benefit of this disclosure, will recognize the appropriate pH-adjuster and amount thereof to use for a chosen application.

Continuous Phase

In various embodiments, the aqueous phase is a continuous phase of the treatment fluid.

Other Fluid Additives

A treatment fluid can contain additives that are commonly used in oil field applications, as known to those skilled in the art. These include, but are not necessarily limited to, brines, inorganic water-soluble salts, salt substitutes (such as trimethyl or tetramethyl ammonium chloride), pH control additives, surfactants, defoamers, breakers, breaker aids, oxygen scavengers, alcohols, scale inhibitors, corrosion inhibitors, hydrate inhibitors, fluid-loss control additives, proppant, gravel, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the treatment fluid.

Methods of Treating a Well with the Treatment fluid

According to various embodiments of the disclosure, methods of treating a well are provided, the methods including the steps of: forming a treatment fluid according to the disclosure; and introducing the treatment fluid into the well.

Friction Reducer Applications

In various embodiments, the methods provide a treatment fluid with a friction reducing property.

During the drilling, completion and stimulation of subterranean wells, fluids are often pumped through tubular structures (for example, pipes, coiled tubing, etc.). A considerable amount of energy may be lost due to turbulence in the treatment fluid. Because of these energy losses, additional horsepower may be necessary to achieve the desired treatment. To reduce these energy losses, certain polymers (referred to herein as "friction-reducing polymers") have been included in these treatment fluids.

Suitable friction reducing polymers should reduce energy losses due to turbulence within the treatment fluid. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable friction reducing polymers may be at least about 2,500,000, as determined using intrinsic viscosities. In certain embodiments, the average molecular weight of suitable friction reducing polymers may be in the range of from about 7,500,000 to about 20,000,000. Those of ordinary skill in the art will recognize that friction-reducing polymers having molecular weights outside the listed range may still provide some degree of friction reduction. Typically, friction-reducing polymers are linear and flexible, for example, having a persistence length less than 10 nm.

For example, various methods according to this disclosure can provide a "slick water" or "slick brine" consistency to help reduce pumping friction pressures.

Fracturing Treatment Application

In certain embodiments (for example, fracturing operations), the treatment fluid may be introduced into the subterranean formation at or above a pressure sufficient to create or enhance one or more fractures in a portion of the subterranean formation. In an embodiment, the step of introducing comprises introducing under conditions for fracturing a treatment zone. The fluid is introduced into the treatment zone at a rate and pressure that are at least sufficient to fracture the zone.

Designing a fracturing treatment usually includes determining a designed total pumping time for the treatment of the treatment zone or determining a designed total pumping volume of fracturing fluid for the treatment zone. The tail end of a fracturing treatment is the last portion of pumping time into the zone or the last portion of the volume of fracturing fluid pumped into the zone. This is usually about the last minute of total pumping time or about the last wellbore volume of a fracturing fluid to be pumped into the zone. The portion of pumping time or fracturing fluid volume that is pumped before the tail end of a fracturing stage reaches into a far-field region of the zone.

A person of skill in the art is able to plan each fracturing treatment in detail, subject to unexpected or undesired early screenout or other problems that might be encountered in fracturing a well. A person of skill in the art is able to determine the wellbore volume between the wellhead and the zone. In addition, a person of skill in the art is able to determine the time within a few seconds in which a fluid pumped into a well should take to reach a zone.

In addition to being designed in advance, the actual point at which a fracturing fluid is diverted from a zone can be determined by a person of skill in the art, including based on observed changes in well pressures or flow rates.

Fracturing methods can include a step of designing or determining a fracturing treatment for a treatment zone of the subterranean formation prior to performing the fracturing stage. For example, a step of designing can include: (a)

determining the design temperature and design pressure; (b) determining the total designed pumping volume of the one or more fracturing fluids to be pumped into the treatment zone at a rate and pressure above the fracture pressure of the treatment zone; (c) designing a fracturing fluid, including its composition and rheological characteristics; (d) designing the pH of the continuous phase of the fracturing fluid, if water-based; (e) determining the size of a proppant of a proppant pack previously formed or to be formed in fractures in the treatment zone; and (f) designing the loading of any proppant in the fracturing fluid.

Forming Treatment fluid

A fluid can be prepared at the job site, prepared at a plant or facility prior to use, or certain components of the treatment fluid can be pre-mixed prior to use and then transported to the job site. Certain components of the treatment fluid may be provided as a "dry mix" to be combined with treatment fluid or other components prior to or during introducing the treatment fluid into the well.

In various embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

In various embodiments, a step of forming a treatment fluid for use in a well can including the use of mixing equipment, such as commonly found on a well site during a treatment operations, including, for example, a blender or a manifold for mixing two or more component streams form a stream of the treatment fluid.

Introducing Into Well or Zone

Often the step of delivering or introducing a treatment fluid into a well is within a relatively short period after forming the treatment fluid, for example, less within 30 minutes to one hour. More preferably, the step of delivering introducing the fluid is immediately after the step of forming the fluid, which is "on the fly."

It should be understood that the step of introducing a treatment fluid into a well can advantageously include the use of one or more fluid pumps.

Introducing Below or Above Fracture Pressure

In various embodiments, the step of introducing is at a rate and pressure below the fracture pressure of the treatment zone.

In various embodiments, the step of introducing comprises introducing under conditions for fracturing a treatment zone. The treatment fluid is introduced into the treatment zone at a rate and pressure that are at least sufficient to fracture the zone.

In various embodiments, the step of introducing into the portion of the well is at an estimated shear greater than 200/sec, or greater than 300/sec, or greater than 400/sec, or greater than 500/sec.

Flow Back Conditions

In various embodiments, the step of flowing back is within 5 days of the step of introducing the treatment fluid. In some other various embodiments, the step of flowing back is within 1 day of the step of introducing.

Producing Hydrocarbon from Subterranean Formation

Preferably, after any such use of a treatment fluid according to the disclosure, a step of producing hydrocarbon from the well or a particular zone is the desirable objective.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of treating a well, the method comprising:
   (A) forming a treatment fluid comprising:
      (i) an aqueous phase;
      (ii) a first polysaccharide, wherein the first polysaccharide comprises at least a first monomeric unit and a second monomeric unit and the first polysaccharide further comprises a first reducing chain end, wherein the first polysaccharide is dispersed or dissolved in the aqueous phase;

(iii) a second polysaccharide, wherein the second polysaccharide comprises at least a third monomeric unit and a fourth monomeric unit and the second polysaccharide further comprises a second reducing chain end, wherein the second polysaccharide is dispersed or dissolved in the aqueous phase; and (iv) at least one chain connector comprising a first functional group and a second functional group, wherein the first functional group reacts with the first reducing chain end of the first polysaccharide and the second functional group reacts with the second reducing chain end of the second polysaccharide, wherein the at least one chain connector is dispersed or dissolved in the aqueous phase; and (B) reacting the first polysaccharide and the second polysaccharide with the at least one chain connector; and (C) introducing the treatment fluid into the well.

2. The method according to claim 1, further comprising: allowing time for the first polysaccharide and the second polysaccharide to react with the at least one chain connector prior to introducing the treatment fluid into the well.

3. The method according to claim 1, wherein the first polysaccharide and the second polysaccharide are selected from the group consisting of guar, guar derivatives, cellulose, and cellulose derivatives.

4. The method according to claim 1, wherein the first polysaccharide and the second polysaccharide are water-soluble.

5. The method according to claim 1, wherein the at least one chain connector is capable of forming an imine with an aldehyde.

6. The method according to claim 1, wherein the at least one chain connector is or comprises a hydrazine, hydroxylamine, semicarbazide, and any combination thereof.

7. The method according to claim 1, wherein the at least one chain connector is or comprises a polyethylene oxide having terminal groups selected from the group consisting of hydrazine, hydroxylamine, semicarbazide, and any combination thereof.

8. The method according to claim 1, wherein the aqueous phase comprises a source of water selected from the group consisting of: freshwater, brackish water, brine, well flowback water, well produced water, and any combination thereof.

9. The method according to claim 1, wherein the aqueous phase comprises an inorganic salt dissolved therein.

10. The method according to claim 1, wherein the aqueous phase is a continuous phase of the treatment fluid.

11. The method according to claim 1, wherein introducing the treatment fluid is at a rate and pressure that is less than sufficient to fracture a treatment zone in the well.

12. The method according to claim 1, wherein introducing the treatment fluid is at a rate and pressure that is at least sufficient to fracture a treatment zone in the well.

13. The method according to claim 1, wherein forming the treatment fluid comprises mixing at least a portion of the aqueous phase and the first polysaccharide and the second polysaccharide in mixing equipment.

14. The method according to claim 1, wherein introducing the treatment fluid comprises introducing the treatment fluid through a tubular in a wellbore of the well.

15. The method according to claim 14, wherein the tubular is selected from the group consisting of: a casing, a tubing string, a coiled tubing, and a liner pipe.

16. The method according to claim 1, wherein the first polysaccharide and the second polysaccharide comprise the same chemical composition.

17. A method of treating a well, the method comprising:
(A) forming a treatment fluid comprising:
(i) an aqueous phase; and
(ii) a polymeric material produced by reacting:
(a) a first polysaccharide comprising at least a first monomeric unit and a second monomeric unit, wherein the first polysaccharide further comprises a first reducing chain end;
(b) a second polysaccharide comprising at least a third monomeric unit and a fourth monomeric unit, wherein the second polysaccharide further comprises a second reducing chain end; and
(c) at least one chain connector comprising a first functional group and a second functional group, wherein the first functional group reacts with the first reducing chain end of the first polysaccharide and the second functional group reacts with the second reducing chain end of the second polysaccharide; and (B) introducing the treatment fluid into the well.

18. The method according to claim 17, further comprising:
producing the first polysaccharide and the second polysaccharide in a fermentation broth.

19. The method according to claim 18, further comprising:
reacting the first polysaccharide and the second polysaccharide and the at least one chain connector to produce the polymeric material without isolating the first polysaccharide and the second polysaccharide from the fermentation broth.

20. The method according to claim 19, further comprising:
isolating the polymeric material from the fermentation broth.

* * * * *